US007659881B2

(12) United States Patent
Lee

(10) Patent No.: US 7,659,881 B2
(45) Date of Patent: Feb. 9, 2010

(54) DISPLAY DEVICE FOR VEHICLE

(75) Inventor: Kwan Ho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 684 days.

(21) Appl. No.: 11/231,831

(22) Filed: Sep. 22, 2005

(65) Prior Publication Data

US 2006/0108900 A1 May 25, 2006

(30) Foreign Application Priority Data

Nov. 23, 2004  (KR) .............. 10-2004-0096495
May 27, 2005   (KR) .............. 10-2005-0045115

(51) Int. Cl.
G09G 3/34 (2006.01)
(52) U.S. Cl. ............ 345/110; 345/905; 312/319.6
(58) Field of Classification Search ............ 312/319.6; 340/815.4, 461, 995; 248/27.1; 345/7, 108, 345/110, 905; 348/837; 455/347, 348; 297/313, 297/330; 29/732; 33/568–573; 361/679.01, 361/679.02
See application file for complete search history.

(56) References Cited

U.S. PATENT DOCUMENTS

| 5,255,470 | A * | 10/1993 | Dupuy ............ 49/227 |
| 5,964,640 | A * | 10/1999 | Barton et al. ............ 446/454 |
| 6,505,578 | B1 * | 1/2003 | Scott et al. ............ 119/867 |
| 6,583,773 | B1 * | 6/2003 | Nogami et al. ............ 345/7 |
| 2003/0038518 | A1 * | 2/2003 | Williams ............ 297/330 |

FOREIGN PATENT DOCUMENTS

| CN | 2598036 (Y) | 1/2004 |
| CN | 1527317 A | 9/2004 |
| DE | 10130703 | 1/2003 |
| DE | 10219474 | 11/2003 |
| EP | 1454796 | 9/2004 |
| JP | 2-31577 | 2/1990 |
| JP | 11-342798 | 12/1999 |

OTHER PUBLICATIONS

European Search Report.
Chinese Office Action dated May 8, 2009.

\* cited by examiner

Primary Examiner—Amare Mengistu
Assistant Examiner—Dmitriy Bolotin
(74) Attorney, Agent, or Firm—KED & Associates, LLP

(57) ABSTRACT

Embodiments of a display device for a vehicle and methods for the same can adjust operation velocity and stroke of a monitor by changing simple mechanical configurations of a driving apparatus for the monitor in the display device. The display device for a vehicle can include a monitor in a case for displaying an image on its front surface and a movable unit that can be installed to the case to reciprocally move the monitor. A control lever can be installed between the monitor and the movable unit to be inclined at a predetermined angle and configured to cooperate with the movable unit. Therefore, it is possible to provide an inexpensive display device capable of satisfying a variety of users' needs and design requirements.

19 Claims, 10 Drawing Sheets

DISPLAY DEVICE FOR VEHICLE

BACKGROUND OF THE INVENTION

1. Field of the Invention

The present invention relates to a display device, and more particularly, to a display device for a vehicle for allowing a user to view images within the vehicle.

2. Background of the Related Art

A display device for allowing a user to view images is generally mounted in a vehicle. The display device shows TV images, DVD images, position information of an navigation system, or the like. As shown in FIG. 1, a monitor 1 of the display device is installed in a center facia 2' mounted on a crush pad 2 to appear and disappear. The monitor 1 is configured to be fully or partially retracted into the center facia 2'. Even when the monitor 1 is partially received in the center facia 2', that is, a third of the monitor 1 is inserted into the center facia 2', images can be displayed on the monitor 1.

FIG. 2 is an exploded perspective view of the display device according to the prior art. As shown in FIG. 2, the monitor 1, which is a part showing images, is installed in the center facia 2' to appear and disappear. A mounting panel 3 is mounted on a rear surface of the monitor 1. Guide grooves 5 are formed on both ends of the mounting panel 3 in a direction in which the monitor 1 is raised or lowered. Rack gears 7 are provided on the mounting panel 3 in parallel with the guide grooves 5.

The mounting panel 3 is fixed to the monitor 1 but moves with respect to a frame 9. The frame 9 is provided with guide ribs 9', which are positioned in the guide grooves 5 and guide the movement of the monitor 1.

A driving motor 10 is installed on a rear surface of the frame 9. The driving motor 10 provides a driving force needed to elevate the monitor 1. The driving force of the driving motor 10 is transmitted through a gear train 11 including a plurality of gears. The gears of the gear train 11 are installed on a surface of the frame 9 so that rotation axes are parallel with each other. The last ones of the gears of the gear train 11 correspond to driving gears 12 and penetrate the frame 9 to be meshed with the rack gears 7 of the mounting panel 3.

As described above, however, the prior art display device has various disadvantages. For example, since the driving force of the driving motor 10 is transmitted through the gear train 11 in the prior art, the elevation velocity of the monitor 1 cannot be freely changed from a mechanical point of view. In a case where the same driving motor 10 is used, the gear train 11 should be modified when the elevation velocity of the monitor 1 is to be changed. Since the elevation velocity of the monitor 1 cannot be changed using the existing parts, the existing parts should be replaced with newly designed ones to change the elevation velocity. Further, in the prior art, the elevated height of the monitor 1 cannot be set differently by operating the existent gear train 11. To set the elevated height of the monitor differently, the operation of the driving motor 10 should be controlled, or the gear train 11 and/or the rack gears 7 and the like should be newly designed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a display device and method solving at least the above problems and/or disadvantages and to provide at least the advantages described hereinafter.

Another object of the invention is to provide a display device and method capable of controlling an elevation, moving speed or stroke of a monitor.

Another object of the invention is to provide a display device and method capable of mechanically controlling an elevated height of a monitor.

Another object of the invention is to provide a display device and method capable of mechanically controlling an elevation velocity of a monitor.

Another object of the invention is to provide a display device and method capable of mechanically controlling a stroke of a monitor.

A further object of the invention is to provide a reduced size display device.

According to an aspect of the invention for achieving the above objects and following advantages in a whole or in part, there is provided a display device for a vehicle that includes a monitor configured to display an image on a surface, a guide configured to extend along a predetermined direction in which the monitor is moved, a guide follower provided on the monitor to be movable together with the monitor along a longitudinal direction of the guide, wherein the guide is configured to engage the guide follower during movement of the monitor and a movable unit configured to cause the monitor to move while moving in a direction different to the longitudinal direction of the guide responsive to a driving force.

According to another aspect of the invention, for achieving the above objects and following advantages in a whole or in part, there is provided a display device for a vehicle that includes a case, a monitor configured to display an image on a front surface exposed through the case, a driving motor installed to the case and configured to provide a driving force to move the monitor, a movable unit configured to move responsive to the driving force from the driving motor and a control lever coupled between the monitor and the movable unit and inclined at a predetermined angle to cause the monitor to move between first and second positions in cooperation with the movable unit.

According to a further aspect of the invention, for achieving the above objects and following advantages in a whole or in part, there is provided a display device for a vehicle that includes a monitor configured to display an image, a driving motor configured to provide a driving force to move the monitor between an open and closed condition relative to a case, a movable unit configured receive the driving force from the driving motor and a control lever configured to be fixed at a plurality of positions between the monitor and the moveable unit to cause the monitor to move in cooperation with the movable unit, wherein the plurality of positions include a first position where the control lever is configured to cause the monitor to move between the open and closed condition according to a first condition and a second position where the control lever is configured to cause the monitor to move between the open and closed condition according to a second condition, wherein the first and second conditions are different.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
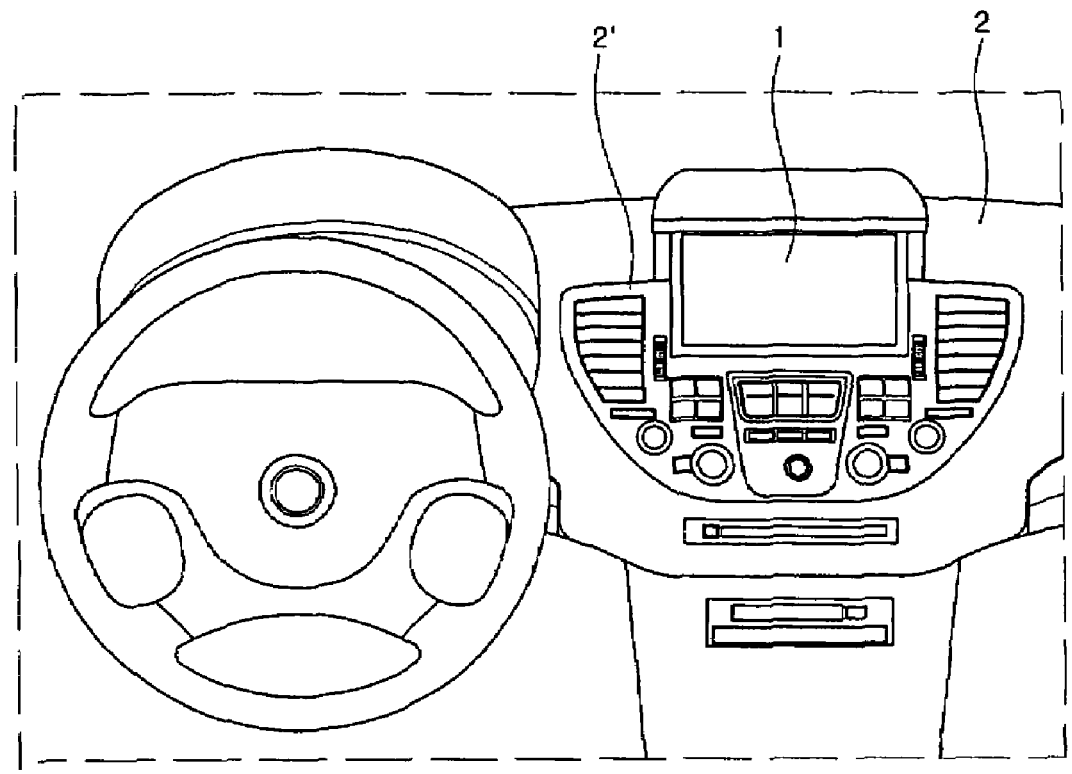
FIG. 1 is a front view of a vehicle interior in which a display device for a vehicle according to a prior art is employed.
Figure 2:
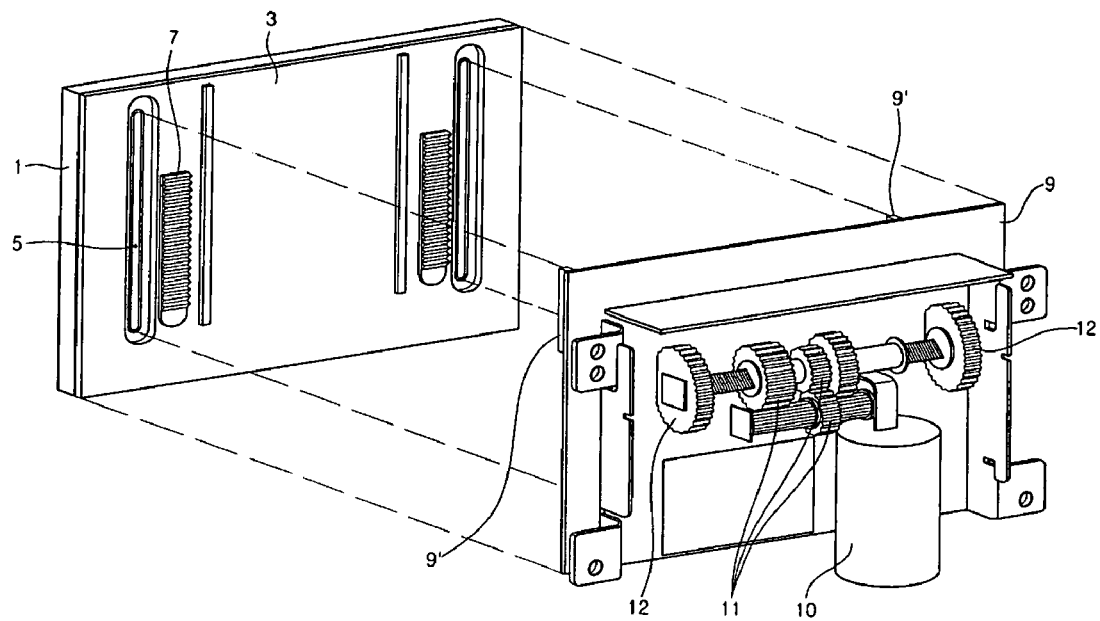
FIG. 2 is an exploded perspective view showing the display device for a vehicle according to the prior art.
Figure 3:
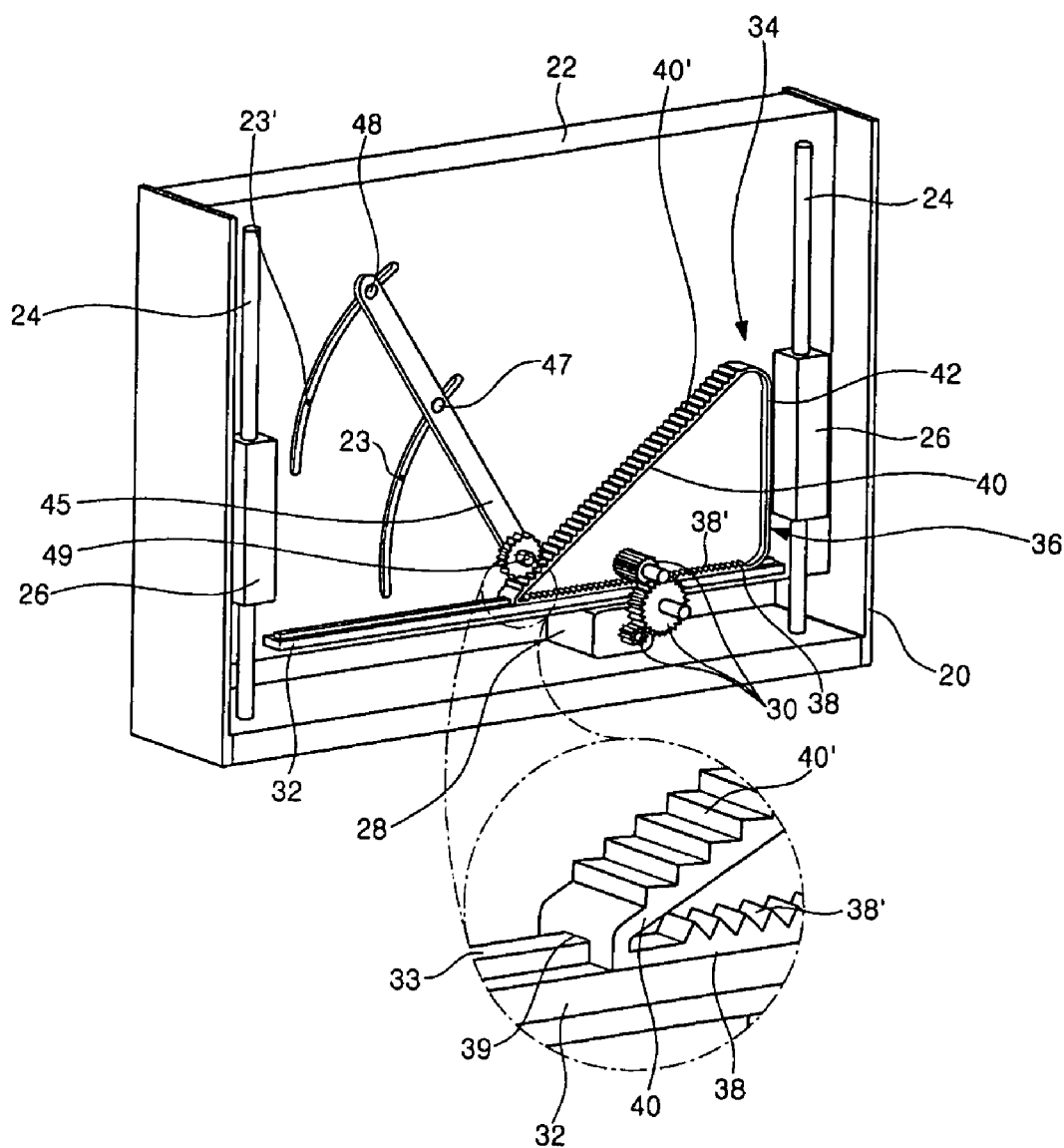
FIG. 3 is a diagram showing a rear perspective view of a first embodiment of a display device for a vehicle according to the present invention.
Figure 4:
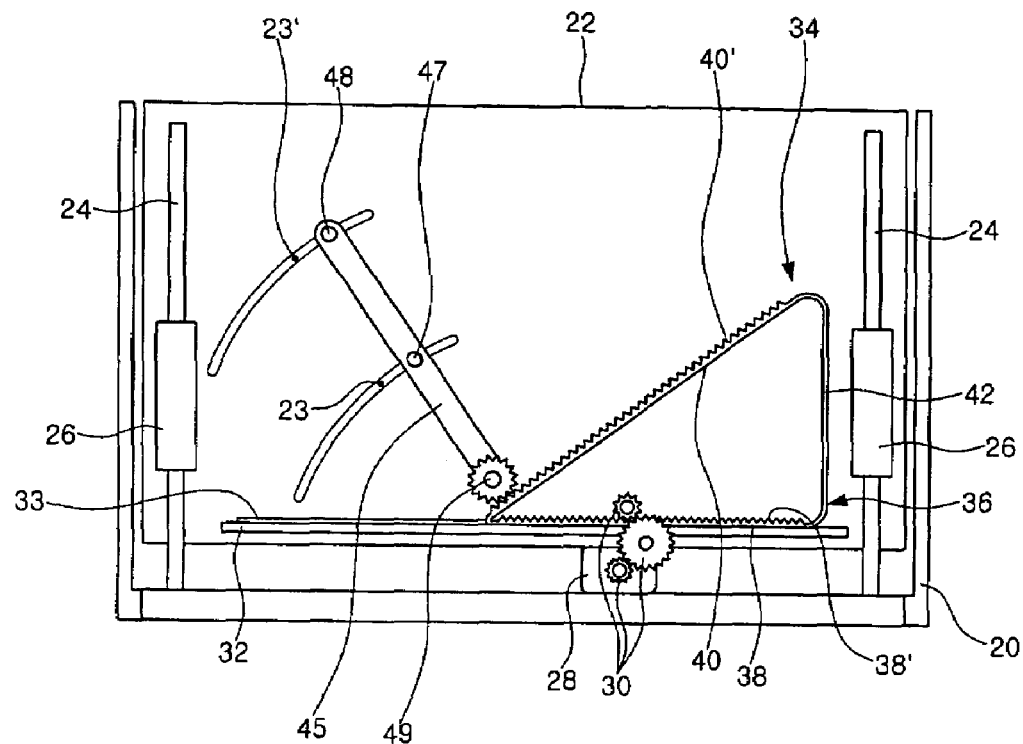
FIG. 4 is a diagram showing a rear view of the first embodiment of the present invention.
Figure 5:
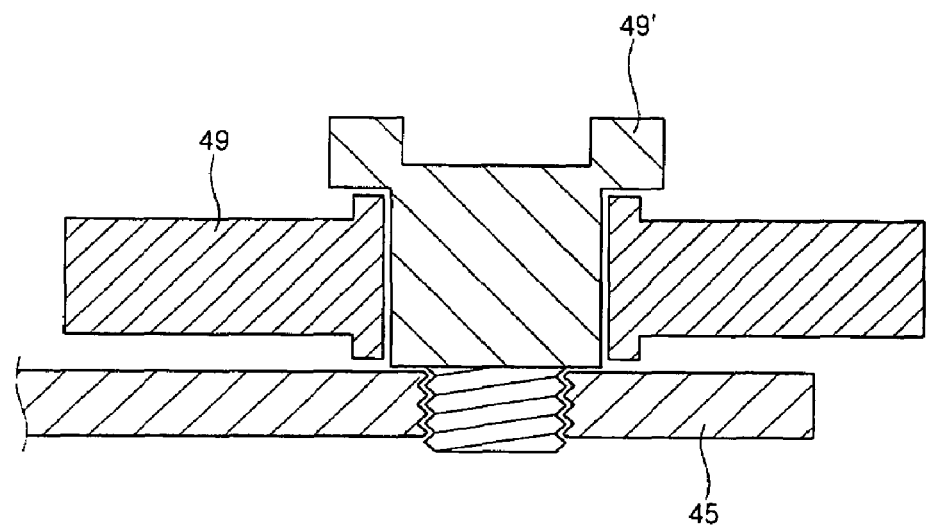
FIG. 5 is a diagram showing a sectional view of a cooperation gear of the first embodiment of the present invention.

FIG. 3 shows a rear perspective view of a first embodiment of a display device for a vehicle according to the invention, and FIG. 4 shows a rear view of the first embodiment of the invention. FIG. 5 shows a sectional view of a cooperation gear of the first embodiment of the present invention.

In embodiments of the invention, the elevation velocity, height and the like of a monitor, which is installed to a case of the display device to be elevated, can be mechanically controlled, for example, by controlling an installation configuration or state. In embodiments according to the invention, a configuration that can control the elevation velocity or height of the monitor according to a selected installed configuration (e.g., installation angle) can be provided on the route along which a driving force of a driving motor is transmitted.

As shown in FIG. 3, a case 20 can define a frame and appearance of the display device. The case 20 is partially shown in the figures for the purpose of not hiding parts of the display device (e.g., monitor) with the case 20. A portion of the front face of the case 20 can be opened, and the other portion need not shield the inside from the outside. For example, a portion of the display device hidden in a crush pad is not necessarily shielded by the case 20.

Images can be displayed on a front surface of a monitor 22. A liquid crystal panel or the like can be used as a monitor. The monitor 22 can include an additional cover to enclose the liquid crystal panel except for the front surface thereof. At least two of first and second fixing guide channels 23 and 23' can be located at a rear surface of the monitor 22 (e.g., in parallel). The fixing guide channels 23 and 23' can have the same radius of curvature. The fixing guide channels 23 and 23' can guide the position in which a control lever 45 is installed. The guide channels 23 and 23' can serve to guide the installation of the control lever 45, however, each of them is not necessarily formed continuously in the form of a channel as the invention is not intended to be so limited. For example, a plurality of fastening holes to which fastening fixing members 47 and 48 can be fastened may be formed to have predetermined traces.

The monitor 22 installed can be partially inserted into a center facia or crush pad of the vehicle. When an image signal is not supplied to the monitor or when a small screen is sufficient to display images on the monitor, the monitor 22 can remain partially inserted in the center facia or the like. However, when a full-size screen is necessary, the monitor 22 can be automatically or manually exposed to the outside from the center facia or the like.

Guide bars 24 in the case 20 can extend in a direction in which the monitor 22 is elevated. The guide bars 24 can be installed at the positions corresponding to both ends of the monitor 22, respectively. Guide blocks 26 can be provided at both ends on a rear surface of the monitor 22 to correspond to the guide bars 24. The guide bars 24 can penetrate the guide blocks 26 to be guided by the guide blocks 26 such that the monitor 22 can be guided.

It is preferred that the guide blocks 26 be arranged at lower end of the rear surface of the monitor 22. One reason is to increasingly elevate the monitor 22 since the guide blocks 26 can move up to the distal ends of the guide bars 24. However, the invention is not intended to be so limited. For example, if the movement of the monitor 22 can be guided by the case 20 and the like, the guide bars 24 and the guide blocks 26 are not necessary.

A driving motor 28 can be near the center position of the lower portion of the case 20. The driving motor 28, which preferably rotates normally and reversely, can provide a driving force for elevating the monitor 22. There can be a gear train 30 including a plurality of gears or the like for transmitting the driving force of the driving motor 28. The gears of the gear train 30 are rotatably installed in the case 20.

A guide rail 32 can be installed in a lower portion of the case 20 to extend from side to side. The guide rail 32 can be at the position higher than the bottom surface of the case 20 by a predetermined height. A guide rib 33 can be formed on the guide rail 32 to longitudinally extend along the center thereof. The guide rib 33 can relatively protrude on the upper surface of the guide rail 32. The guide rib 33, which is formed to extend along the guide rail 32, may be formed continuously or intermittently. It is preferred that the guide rail 32 be installed to be supported on a portion protruding from a rear surface of the case 20.

A movable unit 34 can be moved (e.g., reciprocate) along the guide rail 32. The movable unit 34 can move along the guide rail 32 with the driving force of the driving motor 28. The movable unit 34 can be shaped as a triangle as viewed from the rear surface of the monitor 22. For example, a triangular frame 36 of the movable unit 34 can have the shape of a right triangle.

A parallel portion 38 of the triangular frame 36 can be parallel with the guide rail 32. A driven rack 38', which can mesh with the last gear of the gear train 30, is preferably formed on the parallel portion 38. The driven rack 38' can receive the driving force of the driving motor 28 through the gear train 30. A guide channel 39, which can guide the guide rib 33 of the guide rail 32 (e.g., seated on and guided in), can be formed on a lower surface of the triangular frame 36 corresponding to the parallel portion 38. However, the invention is not intended to be so limited. For example, the guide rib 33 and the guide channel 39 may be provided on the triangular frame 36 and the guide rail 32, respectively.

An inclined portion 40 of the triangular frame 36 can be inclined at a predetermined angle, for example, with respect to the parallel portion 38. The inclined portion 40 can correspond to the hypotenuse of the triangular frame 36. A driving rack 40' can be formed on the inclined portion 40.

Ends of the parallel portion 38 and the inclined portion 40 can be coupled to each other, while the other ends thereof can be coupled through a vertical portion 42. The vertical portion 42 can vertically extend with respect to the guide rail 32.

The movable unit 34 need not be a triangle as shown in FIGS. 3 and 4. For example, if an angle between the parallel portion 38 and the inclined portion 40 and a length of the section in which the driven rack 38' and the driving rack 40' are formed can correspond to the necessary moving distance of the monitor 22, any other configurations different from that of the embodiment can be used or applied to the movable unit 34.

The control lever 45 can be installed on the rear surface of the monitor 22. The control lever 45 can be fixed to the fixing guide channels 23 and 23' (e.g., with the first and second fixing members 47 and 48). The first and second fixing members 47 and 48 can cause the control lever 45 to be fixed on the rear surface of the monitor 22 at a predetermined angle. Here, it is preferred that the extension direction of the control lever 45 be perpendicular to the inclined portion 40 of the movable unit 34. One reason the control lever 45 is perpendicular to the inclined portion 40 is to effectively support the weight of the monitor 22.

The control lever 45 may be fixed at a variety of positions of the rear surface of the monitor 22. That is, the installation position of the control lever 45 can be changed along the fixing guide channels 23 and 23'. As the installation position of the control lever 45 is changed, the height up to which the monitor 22 can be raised is also changed. Similarly, as the inclination of the inclined portion 40 of the triangular frame 36 is changed, the height up to which the monitor 22 can be raised is also changed.

For example, the angle between the parallel portion 38 and the inclined portion 40 can be designed according to a desired working distance of the monitor 22 in a vertical direction. Thus, once the desired vertical working distance of the monitor 22 is determined, the inclined angle of the movable unit 34 can be correspondingly determined.

Accordingly, although the movable unit 34 can be installed at a certain angle as determined above, the working distance of the monitor 22 can be adjusted by replacing the movable unit 34 with another movable unit. For example, even though the vertical working distance of the monitor 22 has been initially determined by setting the angle between the parallel portion 38 and the inclined portion 40 of the movable unit 34, for example, to 30 degrees, the vertical working distance of the monitor 22 can be increased by replacing the movable unit 34 with another movable unit with an inclined angle of the movable unit of more than 30 degrees, e.g., 45 or 60 degrees.

However, the invention is not intended to be so limited. For example, by changing the size of the triangular frame 36, the length of the control lever 45, and the like, the height or working distance up to which the monitor 22 is elevated can be changed in various manners.

A cooperation gear 49 can be rotatably installed at the distal end of the control lever 45. The cooperation gear 49 can move along the driving rack 40' formed on the inclined portion 40 of the triangular frame 36 and cause the monitor 22 to be elevated. That is, the cooperation gear 49 can serve the cooperation between the control lever 45 and the triangular frame 36.

The cooperation gear 49 can include gear teeth meshed with the driving rack 40' and rotatably mounted at the control lever 45 installed on the rear surface of the monitor 22. For example, the cooperation gear 49 is rotatably mounted at the distal end of the control lever 45 with a two-step screw 49' as shown in FIG. 5. Thus, the cooperation gear 49 can rotate while being meshed with the driving rack 40', which moves in a direction as the movable unit 34 moves, and elevate the monitor 22 height wise. That is, as the driving rack 40' formed on the inclined portion 40 of the movable unit 34 is moved, the cooperation gear 49 can rotate and cause the monitor 22 coupled to the control lever 45 to be raised or lowered.

However, the invention is not intended to be so limited. For example, it is unnecessary to use the cooperation gear 49 and the driving rack 40' for the cooperation between the control lever 45 and the triangular frame 36. In this case, without forming the driving rack 40' on the surface of the inclined portion 40, a roller (not shown) may be installed at the distal end of the control lever 45 so that the distal end is guided along the surface of the inclined portion 40. Alternatively, it may be configured so that the control lever 45 itself is guided along the surface of the inclined portion 40. As a further example, it is possible to cause the monitor 22 to be raised by allowing the movement of the triangular frame 36 to push up the control lever 45 or to cause the monitor 22 to be lowered by the self weight of the monitor 22 when the triangular frame 36 is returned. However, the cooperation gear 49 and the driving rack 40' can cause the cooperation between the control lever 45 and the triangular frame 36 to be more secure.

Figure 6:
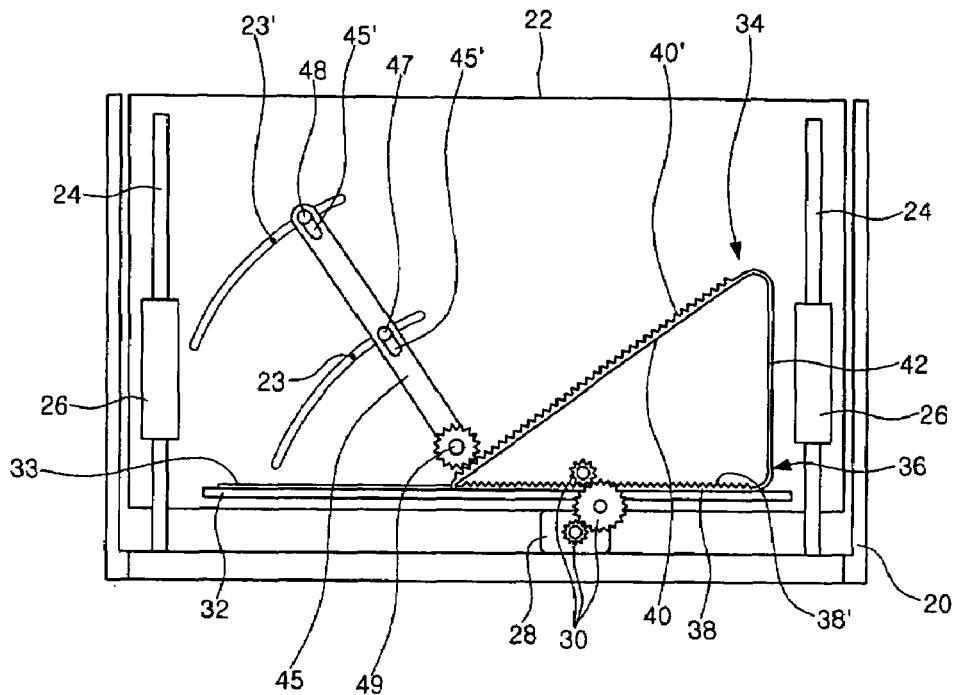
FIG. 6 is a diagram showing a rear view of another embodiment of the present invention.

Another embodiment of a display device according to the invention is shown in FIG. 6. As shown in the configuration of FIG. 6, fixing member slots 45' can be formed in the control lever 45. The fixing member slots 45' can be in the form of a long hole with a length longer than a diameter of the first and second fixing members 47 and 48. However, the invention is not intended to be so limited. The formation of fixing member slots 45' can cause the installation state of the control lever 45 (e.g., fixing guide channels 23, 23) and the combination between the control lever 45 and the movable unit 34 to be various, so that it is possible to more diversely set up the elevated height, speed, etc. of the monitor 22.

Figure 8:
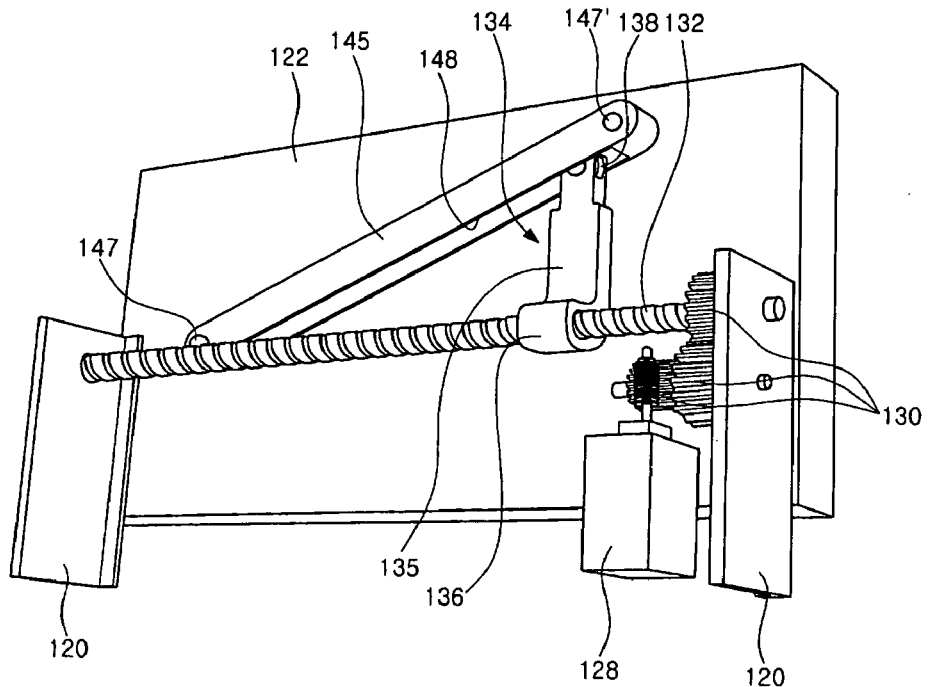
FIG. 8 is a diagram showing a rear perspective view of a second embodiment of the present invention.
Figure 9:
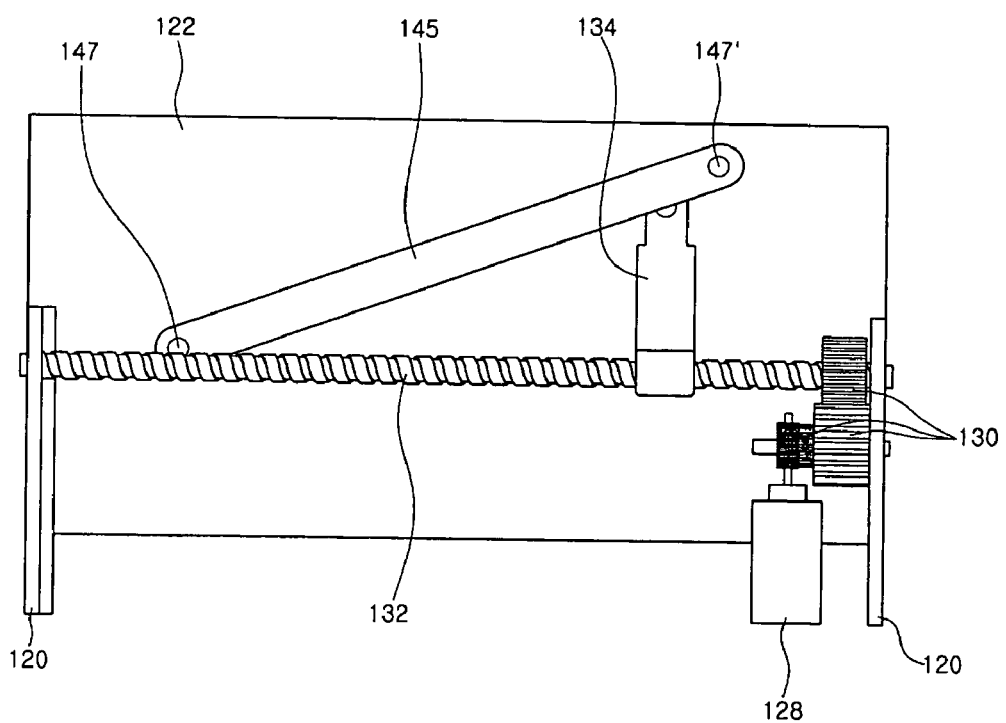
FIG. 9 is a diagram showing a rear view of the second embodiment of the present invention.
Figure 10:
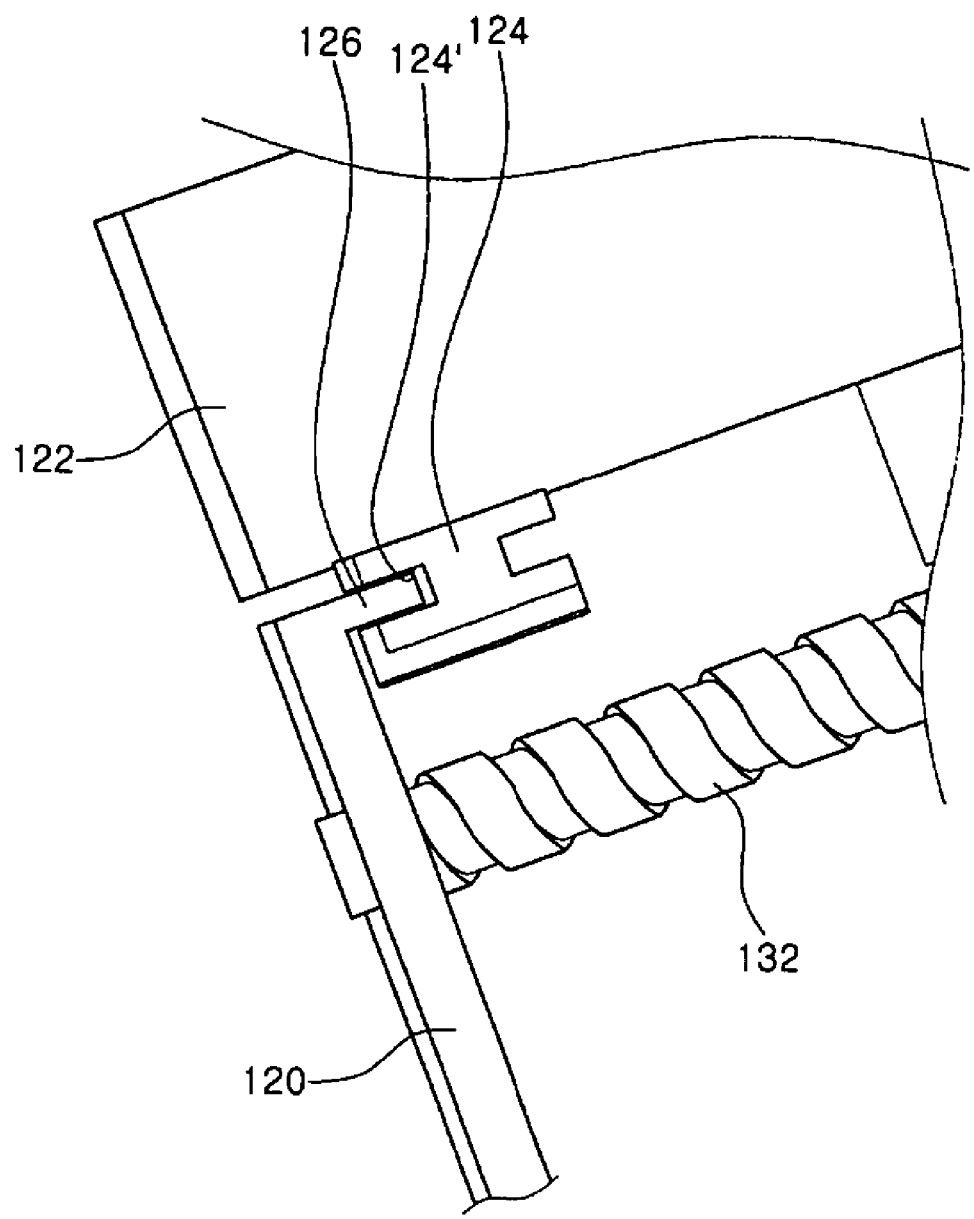
FIG. 10 is a diagram showing a front view of a guide rib and a guide portion according to the second embodiment of the present invention.

A second embodiment of a display device for a vehicle according to the invention is shown in FIGS. 8-10. As shown in FIG. 8, a case 120 can define a frame and appearance of the display device. The case 120 is cut-a-way or partially shown in FIGS. 8-10 for the purpose of not hiding parts of the display device with the case 120. A portion of the front face of the case 120 must be opened, however other portions need not shield the inside from the outside. For example, a portion of the display device hidden in a crush pad is not necessarily shielded by the case 120.

A monitor 122 can include a front surface to display images. A liquid crystal panel is generally used. The monitor 122 can be configured so that an additional cover encloses the liquid crystal panel except for the front surface thereof. The monitor 122 can be installed so as to be partially inserted into a center facia or a crush pad of the vehicle. When an image signal is not supplied to the monitor or a small screen is sufficient to display images on the monitor, the monitor 122 can remain inserted, partially inserted in the center facia or the like. However, when a full-size screen is necessary, the monitor 122 can be exposed to the outside from the center facia or the like either automatically or manually.

Guide portions 124 can extend in the moving direction of the monitor 122 and can be installed on a rear surface of the monitor 122. The guide portions 124 can have guide channels 124' that extend in the moving direction of the monitor 122. The guide channels 124' may be formed integrally with a cover of the monitor 122. Each of the guide channels 124' can be provided at each of positions corresponding to both ends of the monitor 122. Guide ribs 126 can correspond to the guide channels 124' and can be formed on the case 120. The guide ribs 126 are preferably positioned in the guide channels 124' and thus guide the movement of the monitor 122. However, the invention is not intended to be so limited. For example, the guide ribs 126 and guide channels 124' can be swapped and swapped and formed in the monitor cover and case 120, respectively. Further, for example, if the movement of the monitor 122 can be guided by the case 120 and the like, the guide channels 124' and the guide ribs 126 are not necessary.

A driving motor 128 can be installed in the case 120. The driving motor 128, which can rotate normally and reversely, can provide a driving force to elevate the monitor 122. A gear train 130 including a plurality of gears or the like can transmit the driving force of the driving motor 128. The gears of the gear train 130 can be rotatably installed on a driving shaft of the driving motor 128 and in the case 120.

A lead screw 132 can have both ends of the lead screw 132 are rotatably supported in the case 120. The lead screw 132 can extend in the direction perpendicular to the moving direction of the monitor 122. A thread can be on an outer peripheral surface of the lead screw 132. The lead screw 132 can rotate with the driving force of the driving motor 128.

The rotation of the lead screw 132 can cause a movable unit 134 to move along the lead screw 132. A feed portion 136 can protrude at an end of a movable unit body 135 of the movable unit 134. The lead screw 132 can penetrate the feed portion 136. A thread portion, which is guided by the thread portion of the lead screw 132, can be formed on an inner peripheral surface of the feed portion 136, which the lead screw 132 penetrates.

A movable roller 138 can be provided at the other end of the movable unit body 135 opposite to the end at which the feed portion 136 is provided. The movable roller 138 can be rotatably installed at the other end of the movable unit body 135. The movable roller 138 can move along a channel 148 of a control lever 145.

The control lever 145 can be slantingly installed on the rear surface of the monitor 122. The control lever 145 can be fixed to the rear surface of the monitor 122 with fixing members 147 and 147' (e.g., at both ends of the control lever 145). According to positions at which the fixing members 147 and 147' are fixed to the rear surface of the monitor 122, an angle of the control lever 145 can be controlled. According to the angle of the control lever 145, the elevation velocity of the monitor 122 can be changed even though the movable unit 134 moves at a constant velocity.

The control lever 145 can include the channel 148. The channel 148 can extend in the longitudinal direction of the control lever 145. The movable roller 138 can be positioned and move in the channel 148.

Figure 11:
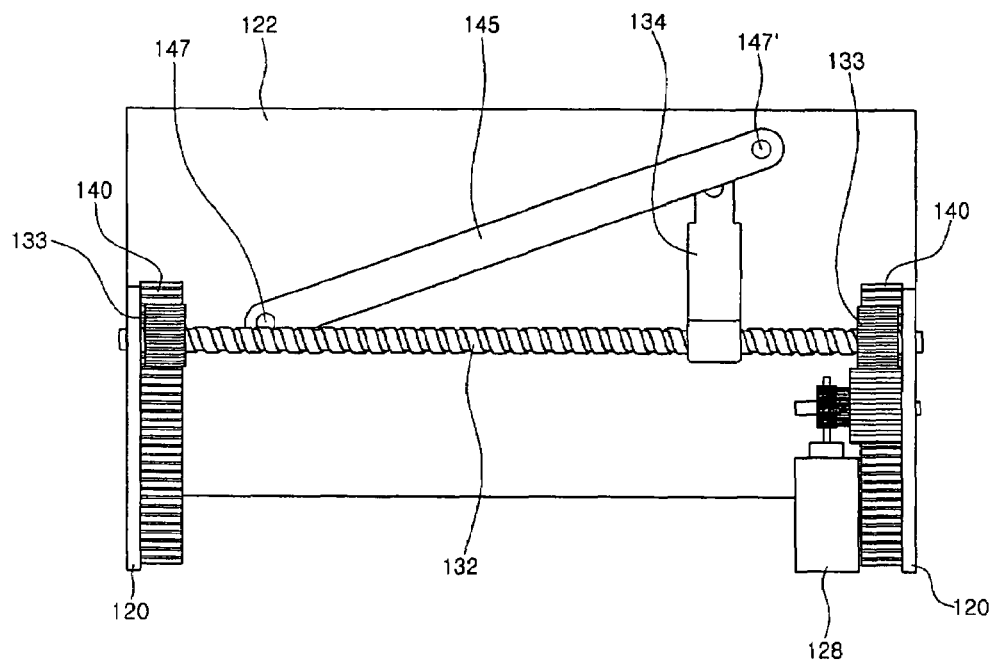
FIG. 11 is a diagram showing a rear view of yet another embodiment of the present invention.

FIG. 11 shows another embodiment of a display device according to the invention. As shown in FIG. 11, guide gears 133 can be installed at ends of the lead screw 132, and guide racks 140 provided on the rear surface of the monitor 122 can meshed with the guide gears 133. The guide racks 140 can extend in the elevation direction of the monitor 122. In the embodiment shown in FIG. 11, the guide portions 124 can be formed with the guide racks 140.

Further, in the second embodiment according to the invention, the fixing guide channels (not shown) for guiding the fastening of the fixing members 147 and 147' may be formed in the rear surface of the monitor 122. Also, the fixing guide channels may be replaced with fastening holes that are intermittently formed to have a predetermined trace instead of the channel form.

Operations of embodiments of a display device for a vehicle according to the invention will be described. Operations of the first embodiment of the invention will be described with reference to FIGS. 7a and 7b.

For example, to allow the monitor 22 to be fully exposed to the outside, the monitor 22 can move upward. Such operations may be effected together with the user's operation of pushing a predetermined button or turning on power. However, the invention is not intended to be so limited.

For example, when a driving signal is provided, the driving motor 28 is supplied with power to operate. The driving force of the driving motor 28 can be transmitted to the movable unit 34 through the gear train 30. The driven rack 38' formed on the parallel portion 38 of the movable unit 34 and the last gear of the gear train 30 can mesh with each other to transmit the driving force to the movable unit 34, so that the movable unit 34 in a prescribed direction (e.g., moves to the left side (the direction represented by a dotted arrow)) in FIG. 7a. Thus, the movable unit can move along the guide rail 32 to the left side.

As the movable unit 34 moves, the cooperation gear 49 meshed with the driving rack 40' formed on the inclined portion 40 of the movable unit 34 can rotate and ascend along the inclined portion 40. If the cooperation gear 49 ascends along the driving rack 40', the control lever 45 can be raised together with and cause the monitor 22 to be raised. For example, the monitor 22 can be raised in the height direction as indicated by a solid line arrow in FIG. 7a.

Figure 7A:
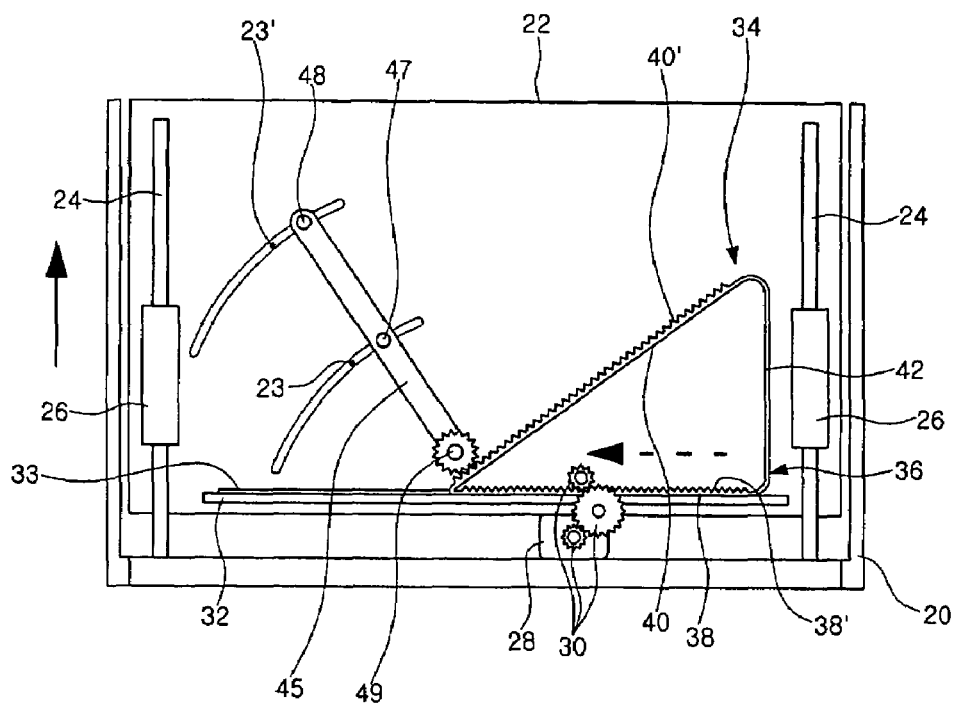
FIG. 7a is a diagram showing an operational view of a state where a monitor is raised according to the first embodiment of the present invention.

As shown in FIG. 7a, the monitor 22 is raised in the direction of the solid arrow, since the guide bars 24 can cooperates with the guide blocks 26 and guide the moving trace of the monitor 22. By tuning off the power for operating the driving motor 28 when the monitor 22 is exposed to the desired extent, the upward movement of the monitor 22 can be controlled or terminated.

Figure 7B:
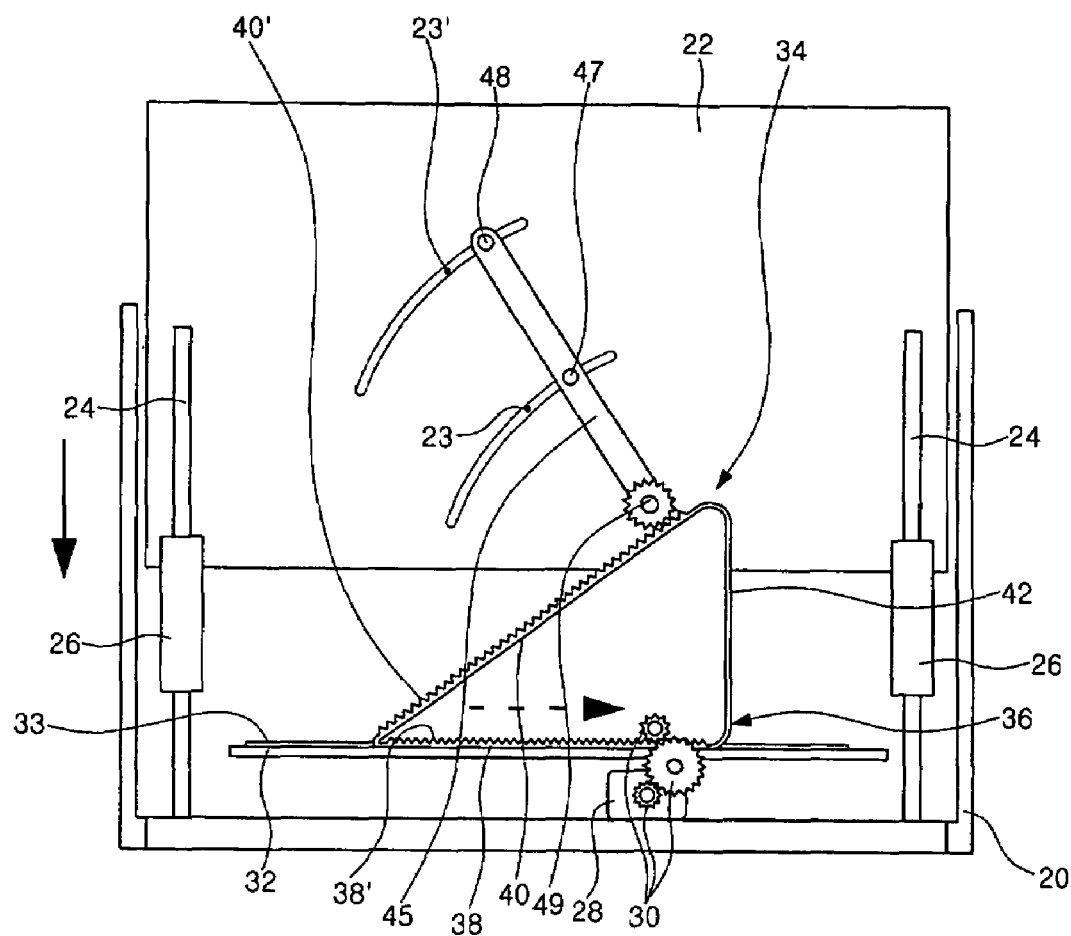
FIG. 7b is a diagram showing an operational view of a state where the monitor is lowered according to the first embodiment of the present invention.

As shown in FIG. 7b, lowering and inserting the monitor 22 into the center facia will now be described. When the driving motor 28 is supplied with the power, the driving motor 28 can be driven in the direction opposite to when the driving motor 28 causes the monitor 22 to be raised in the height direction. Thus, the movable unit 34 can move to the right side (the direction represented by a dotted arrow) in FIG. 7b through the gear train 30 coupled to the driving motor 28.

Accordingly, the cooperation gear 49 meshed with the driving rack 40' of the inclined portion 40 can rotate and descend along the driving rack 40' as the movable unit 34 moves. For example, if the movable unit 34 moves to the right side, while moving along the inclined portion 40 of the movable unit 34, the cooperation gear 49 can cause the monitor 22 to be lowered as indicated by a solid line arrow in FIG. 7b.

According to the first embodiment of the invention, the elevation velocity and stroke of the monitor 22 can be changed according to the inclined angle at which the control lever 45 is installed on the rear surface of the monitor 22. However, the invention is not intended to be so limited. For example, the elevation velocity and stroke of the monitor 22 can also changed by changing a size of the movable unit 34 or the angle of the inclined portion 40.

Figure 12A:
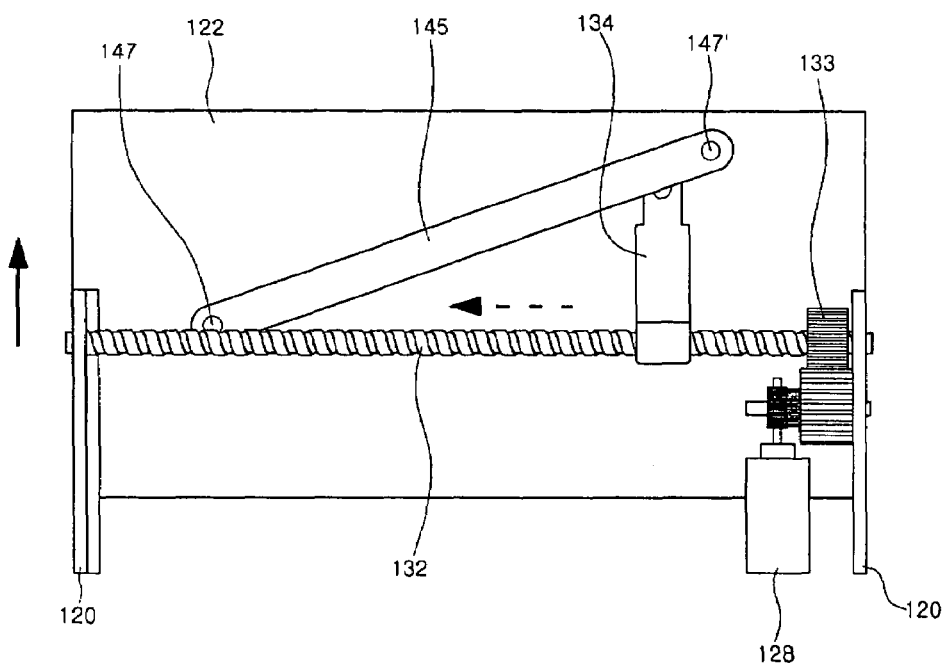
FIG. 12a is a diagram showing an operational view of a state where a monitor is raised according to the second embodiment of the present invention.

Operations of the second embodiment of the present invention will be described. FIG. 12a shows a state where the monitor 122 is not yet raised. In this case, the movable roller 138 of the movable unit 134 can be in a relatively high position of the channel 148 of the control lever 145. In such a state, when a driving signal for lifting up the monitor 122 is provided, the driving motor 128 operates and its driving force can be transmitted through the gear train 130. The driving force transmitted through the gear train 130 can cause the lead screw 132 to rotate, and then, the rotation of the lead screw 132 can causes the movable unit 134 moves along the lead screw 132. As the movable unit 134 moves along the lead screw 132, the movable roller 138 of the movable unit body 135 can move along the channel 148 of the control lever 145.

Figure 12B:
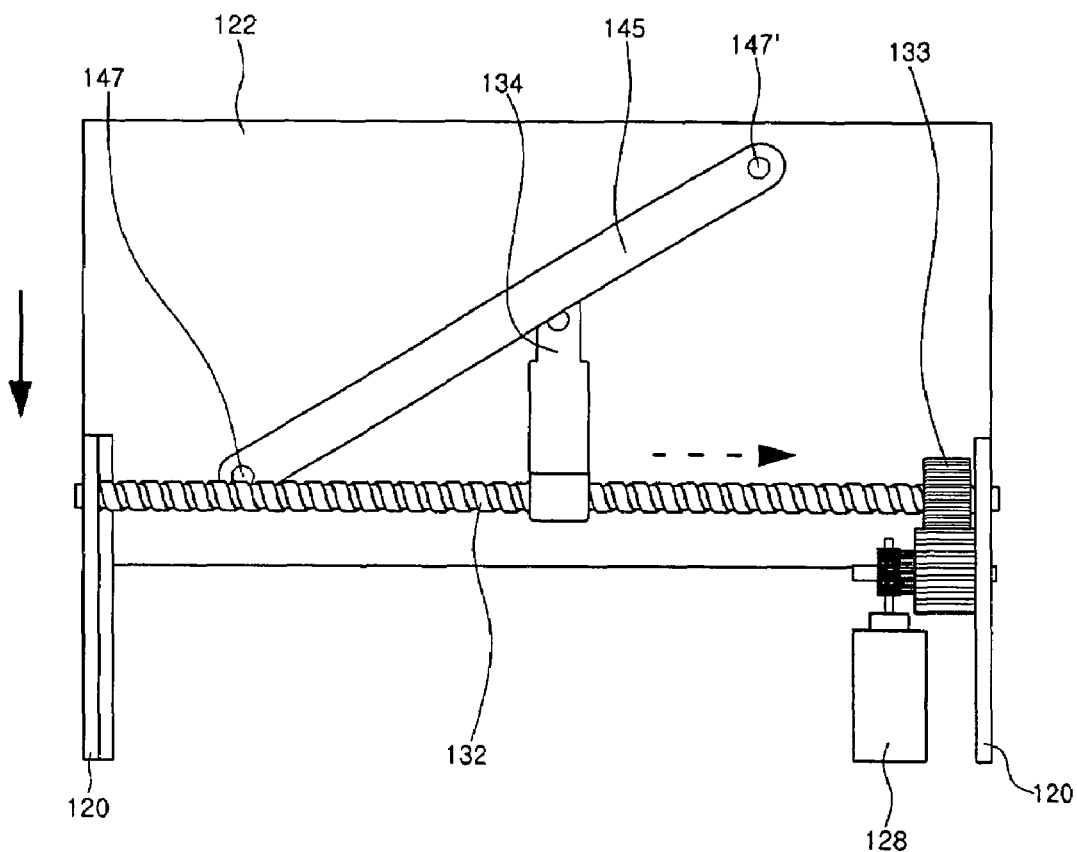
FIG. 12b is a diagram showing an operational view of a state where the monitor is lowered according to the second embodiment of the present invention.

As the movable roller 138 moves along the channel 148, the monitor 122 can be raised. That is, the movable unit 134 can move in a prescribed direction (e.g., indicated by a dotted line arrow in FIG. 12a), and thus, the monitor 122 can be moved in the direction of a solid line arrow. FIG. 12b shows a state where the monitor 122 has been actually raised. When the monitor 122 is raised, the monitor 122 can be fully exposed out of the center facia.

As shown in FIG. 12b, lowering the monitor 122 to its inserted or original position will now be described. When a driving signal is provided, the driving motor 128 can reversely rotate to transmit the driving force of the driving motor 128 to the lead screw 132 through the gear train 130. The lead screw 132 can rotate with the driving force of the driving motor 128 and cause the movable unit 134 to move in the direction of a dotted arrow in FIG. 12b. As the movable unit 134 moves, the movable roller 138 can guide along the channel 148 of the control lever 145, and the movable unit 134 can move to a relatively high position of the control lever 145, so that the monitor 122 is lowered in the direction of a solid line arrow in FIG. 12b.

According to the second embodiment of the invention, the elevation velocity and stroke of the monitor 122 can be changed according to the inclined angle or installation position at which the control lever 145 is installed on the rear surface of the monitor 122. Thus, the elevation velocity and/or stroke of the monitor 122 can be changed by controlling the installation angle and position of the control lever 145. Further, additional movable units can be installed in a coordinated or connected fashion to provide additional points to apply force.

In the embodiment shown in FIG. 11, it is preferred that design values of the guide gears 133 and the guide racks 140 also be changed when the installation angle of the control lever 145 is changed. In this manner, the mesh property between the guide gears 133 and the guide racks 140 can be changed as the elevation velocity of the monitor 122 is changed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Embodiments of a display device for a vehicle and methods for the same according to the invention have various advantages. In embodiments of the invention, the elevation velocity of the monitor can be controlled by changing a mechanical configuration (e.g., the installation angle of the control lever). For example, the elevation velocity of the monitor can be controlled by changing the installation angle of the control lever without replacing the control lever. Further, according to embodiments, it is possible to mechanically control the elevation distance or stroke of the monitor. For example, the elevation stroke of the monitor can be determined by changing the installation angle and position of the control lever. That is, it is possible to provide a display device for a vehicle satisfying users' various needs and design quality can be provided using a mechanical operation or at a lower cost. In addition, a display device for a vehicle having various properties can be provided by replacing the movable unit or the guide gears and the guide racks in addition to the control lever.

Finally, in embodiments according to the invention, the configurations for elevating the monitor can be installed not on additional parts but on the rear surface and in the rear of the monitor, thus, it is possible to relatively reduce or minimize the space that the apparatus for elevating the monitor occupy. Advantageously, a size of the display device for a vehicle can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A display device for a vehicle, comprising:
   a monitor provided in a case and configured to display an image on a surface;
   a guide that extends in a first direction in which the monitor is moved, the guide comprising first and second guide bars that extend in a vertical direction at opposite ends of the monitor;
   a guide follower provided on the monitor so as to be movable together with the monitor in the first direction, wherein the guide is configured to engage the guide follower during movement of the monitor;
   a movable unit configured to move in a second direction that is different than the first direction in response to a driving force generated by a driving motor so as to move the monitor in the first direction, the moveable unit comprising a triangular frame that moves along a guide rail fixed to the case in response to the driving force, wherein the triangular frame comprises:
      a parallel portion that is parallel to the guide rail, the parallel portion including a driven rack that receives the driving force from the driving motor; and
      an inclined portion that is inclined at a predetermined angle with respect to the parallel portion; and
   a control lever coupled to a rear surface of the monitor and operably coupled to the moveable unit, wherein the inclined portion of the moveable unit guides a distal end of the control lever as the moveable unit moves in the second direction so as to move the monitor in the first direction.

2. The display device of claim 1, wherein a moving velocity of the monitor is based on an installation angle and position of the control lever on the rear surface of the monitor.

3. The display device of claim 2, wherein the control lever comprises a cooperation gear installed at the distal end thereof, wherein the cooperation gear moves along a driving rack formed in the inclined portion of the movable unit, and wherein the control lever is fixed to at least one fixing guide channel formed in the rear surface of the monitor by at least one fixing member so as to establish the installation angle and position of the control lever.

4. The display device of claim 2, wherein the control lever comprises at least one fixing slot that extends in a longitudinal direction of the control lever, and wherein the control lever is fixed to at least one fixing guide formed in the rear surface of the monitor by at least one fixing member that extends through the at least one fixing slot.

5. The display device of claim 1, wherein the second direction is perpendicular to the first direction.

6. The display device of claim 1, wherein the driving motor is a bi-directional motor capable of providing a rotational force in both forwards and reverse directions.

7. A display device for a vehicle, comprising:
a case;
a monitor configured to display an image on a front surface exposed through the case;
a driving motor installed to the case and configured to provide a driving force to move the monitor in a first direction;
a movable unit configured to move in a second direction in response to the driving force provided by the driving motor so as to move the monitor in the first direction, the moveable unit comprising a triangular frame that moves along a guide rail fixed to the case in response to the driving force, wherein the triangular frame comprises:
a parallel portion that is parallel to the guide rail, the parallel portion including a driven rack that receives the driving force from the driving motor; and
an inclined portion that is inclined at a predetermined angle with respect to the parallel portion; and
a control lever coupled between the monitor and the movable unit and inclined at a predetermined angle so as to move the monitor between first and second positions as the movable unit moves.

8. The display device of claim 7, wherein the second direction in which the movable unit moves substantially perpendicular to the first direction in which the monitor moves.

9. The display device of claim 8, wherein the inclined portion of the triangular frame engages a distal end of the control lever so as to guide the control lever.

10. The display device of claim 8, wherein the inclined portion of the triangular frame contacts a roller installed at a distal end of the control lever so as to guide the control lever.

11. The display device of claim 8, wherein the inclined portion of the triangular frame includes a driving rack, and a cooperation gear is rotatably installed at a distal end of the control lever such that the cooperation gear is meshed with the driving rack.

12. The display device of claim 8, wherein the control lever is fixed to the monitor by first and second fixing members, and fixing guide channels for guiding the first and second fixing members, respectively, are formed in the rear surface of the monitor, and wherein the control lever is configured to be movable between first and second different positions by the fixing members and the fixing guide channels.

13. The display device of claim 8, wherein the movable unit is movable along a lead screw that extends in a direction perpendicular to the moving direction of the monitor, and wherein the movable unit moves along the lead screw as the lead screw is rotated by the driving force provided by the driving motor.

14. The display device of claim 13, wherein guide gears are installed on both ends of the lead screw such that the guide gears rotate integrally with the lead screw, and wherein guide racks are provided on the rear surface of the monitor at positions corresponding to the guide gears so to mesh with the guide gears and transmit the driving force.

15. The display device of claim 8, wherein guide bars are installed at both ends of the case, in parallel with the moving direction of the monitor, and wherein guide blocks through which the guide bars pass are provided on a rear surface of the monitor so to guide the monitor in a corresponding moving direction.

16. The display device of claim 8, wherein guide ribs are formed at two opposite ends of the case, and guide portions with guide channels formed therein to receive the guide ribs are provided at two opposite ends of a rear surface of the monitor to guide the monitor along a corresponding moving direction.

17. The display device of claim 7, wherein the driving motor is a bi-directional motor capable of providing a rotational force in both forwards and reverse directions.

18. A display device for a vehicle, comprising:
a monitor configured to display an image;
a driving motor configured to provide a driving force in both regular and reverse directions to move the monitor between an open and closed position relative to a case;
a movable unit configured receive the driving force from the driving motor, the moveable unit comprising a triangular frame that moves along a guide rail fixed to the case in response to the driving force, wherein the triangular frame comprises:
a parallel portion that is parallel to the guide rail, the parallel portion including a driven rack that receives the driving force from the driving motor; and
an inclined portion that is inclined at a predetermined angle with respect to the parallel portion; and
a control lever configured to be fixed at a plurality of positions between the monitor and the moveable unit and inclined as a predetermined angle to cause the monitor to move in response to movement of the movable unit, wherein the plurality of positions comprises:
a first position where the control lever is positioned so as to move the monitor between the open and closed condition according to a first condition; and
a second position where the control lever is positioned so as to move the monitor between the open and closed condition according to a second condition, wherein the first and second conditions are different.

19. The display device of claim 18, wherein the conditions are one of elevation, moving speed or stroke, respectively.

* * * * *